United States Patent [19]
Fisli et al.

[11] Patent Number: 5,512,949
[45] Date of Patent: Apr. 30, 1996

[54] MULTIPLE BEAM RASTER OUTPUT SCANNER OPTICAL SYSTEM HAVING TELECENTRIC CHIEF EXIT RAYS

[75] Inventors: Tibor Fisli, Los Altos Hills; David A. Grafton, Santa Monica, both of Calif.

[73] Assignee: Xerox Corporation, Stamford, Conn.

[21] Appl. No.: 174,917

[22] Filed: Dec. 29, 1993

[51] Int. Cl.⁶ ........................................................ B41J 2/47
[52] U.S. Cl. .......................... 347/259; 347/243; 359/204
[58] Field of Search ..................................... 347/260, 258, 347/256, 259, 243, 244; 359/217, 204

[56] References Cited

U.S. PATENT DOCUMENTS 5,067,782  11/1991  Morimoto et al. .
5,208,456   5/1993  Appel et al. ............................. 347/260

FOREIGN PATENT DOCUMENTS

0240002  10/1987  European Pat. Off. .
0360233   3/1990  European Pat. Off. .
0373677   6/1990  European Pat. Off. .
0506338   9/1992  European Pat. Off. .

*Primary Examiner*—Mark J. Reinhart
*Attorney, Agent, or Firm*—Oliff & Berridge

[57] ABSTRACT

A system for eliminating differential scan line bow from raster output scanners aligns at least the chief exit ray of each scanning light beam with the system axis. By aligning the chief exit rays to be essentially parallel to the system axis, the overall bow is reduced, and the bow of different scan lines is essentially identical. Thus, bowed scan lines from different stations in a multi-station printer, or from different passes in a multi-pass printer are generally identical and aligned.

30 Claims, 7 Drawing Sheets

MULTIPLE BEAM RASTER OUTPUT SCANNER OPTICAL SYSTEM HAVING TELECENTRIC CHIEF EXIT RAYS

BACKGROUND OF THE INVENTION

1. Field of the Invention

This invention is generally related to bow compensation in raster output scanners. In particular, this invention is directed to a system for minimizing differential bow distortion of the beams in multi-beam raster output scanners used for single and multi-station xerography based electronic printers and copiers. More specifically, this invention ensures that both the shape and the positioning of any remaining bow in the multiple beams are identical between the beams.

2. Related Art

Figure 5:
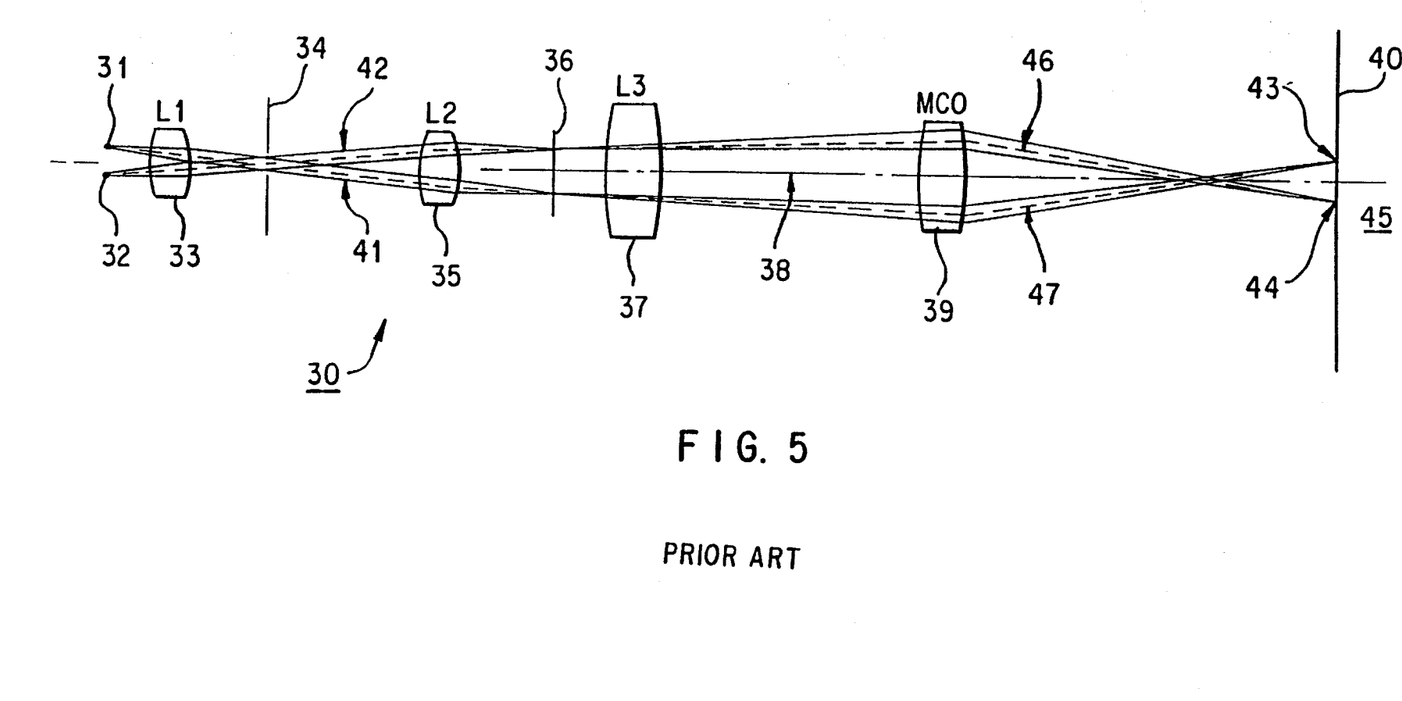
FIG. 5 shows the sagittal block diagram of a typical prior art polygon optical system.

The basic functions of rotating polygon-based optical systems in general are set forth below, and are described only for easier understanding of the technical discussion set forth below and in the detailed description of the preferred embodiments. Prior art FIG. 5 shows a known rotating polygon multi-beam ROS scanner. It should be appreciated that the functions described below equally apply to most polygon-based systems, independently of number of light sources used.

FIG. 5 shows a pair of sagittally offset laser diodes 31 and 32. The beams 43 and 42 emitted by laser diodes 31 and 32 are collimated by the collimator 33 (lens L1). A sagittal aperture 34 is placed in the position where the beams 41 and 42 cross the optical axis, to control the F/#, which in turn controls the spot size. The input cylinder optical element 35 (lens L2) focuses the beams 41 and 42 on the surface of the current polygon facet 36 of the rotating polygon. After reflecting from the current facet 36, the beams 41 and 42 pass through the Fθ lens 37 (lens L3). The Fθ lens 37, in general, has relatively low power in the tangential meridian. The main function of the Fθ lens 37 is to provide focusing in the tangential meridian and control the scan linearity, in terms of uniform spot displacement per unit angle of polygon rotation.

The function of the motion compensating optical element (MCO) 39 is to reimage the focused beams 41 and 42 from the current polygon facet 36 onto the Photo Receptor (PR) plane 40 at a predetermined position, independently of the polygon angle error or tilt of the current facet 36. Such compensation is possible because the focused beams are stationary "objects" for the Fθ lens 37 and the MCO 39. Although, due to polygon tilt, or wobble, the beams 41 and 42 are reflected to different positions of the post-polygon optics aperture for each different facet of the rotating polygon, the beams 41 and 42 are imaged to the same position on the PR plane 40.

In rotating polygon, single spot ROS-based xerographic copiers and printers, bow distortions occur from the accumulation of optics tolerances. Bow itself is the curved line described by the scanned laser beam of the ROS as it moves in the fast scan direction. Thus, the bow appears as a displacement of a scan line in the process direction as the line extends in the fast scan direction.

Although multi-beam, laser diode based ROS is viewed as the most powerful technology for high quality, high throughput xerographic printing, the phenomenon known as differential scan line bow remains as an undesirable side affect. Differential scan line bow arises from the very nature of multi-beam optical systems, where the beams are offset sagittally (in the cross-scan direction) so that half of the beams lie above and half of the beams lie below, or all of the beams lie above or below, the optical axis.

Depending on the design of the system, the differential scan line bow can cause the scan lines to move toward each other (barrel distortion), or away from each other (pin cushion distortion). In both of these cases, the light sources (lasers) are placed on opposite sides of the optical axis. Therefore, the centers of curvature of the bowed scan lines are also on opposite sides of the optical axis. If all light sources are placed on one side of the optical axis, then all of the scan lines will be imaged on the opposite side of the optical axis. Therefore, the centers of curvature of all of the bowed lines will also lie on same side of the axis. However, each line will be bowed at a different radius of curvature. Thus, this is the source of another type of differential bow.

In single-beam monochrome or single-beam multi-pass color printing systems, a few hundred microns of bow causes no noticeable degradation in the image quality because the bow of the successive scan lines is identical. However, in multi-beam, monochrome, single-station printing systems, or in multi-beam, single-pass color printing systems with single or multiple photoreceptor stations, differential bow causes gross misregistration on the photoreceptor(s) both in the single monochrome image and also among the color layers in the multi-layer color image.

In particular, this misregistration can occur because the magnitude and the earlier described different orientation of the differential bow.

The main shortcoming of the prior art system, as shown in FIG. 5, is its inability to produce scan lines free of differential bow. As indicated above, this poor performance is due to the considerable angular deviation between the chief rays and the system axis between the MCO and the PR image plane.

This angular deviation makes it impossible to establish a reasonable range of workable depth of spot focus that coincides with an acceptable motion compensation range. To state it differently, when a reasonable specified polygon angle tilt (+/–one minute (1") of arc for example), is introduced and the image plane is moved in and out of best focus by reasonable distances (+/–2 mm for example), the variation in spot size along the scan, the amount of differential bow, and the amount of scan line shift due the polygon tilt, each become unacceptable for high quality image generation.

SUMMARY OF THE INVENTION

Accordingly, this invention provides for a multibeam ROS in which the chief exit rays from the optical system to the photoreceptor are telecentric. By providing a system having telecentric chief exit rays, the multibeam system becomes both tolerant to pyramidal polygon angular errors and able to maintain adequately stable, essentially no-bow performance over an acceptable depth of focus in single-station xerographic printers. In addition, by closely controlling the overall shape and orientation of the bow, single-pass, multi-station systems are able to print with acceptable levels of misregistration between the various images written by the widely separated xerographic stations.

This invention thus provides for a single-station multiple-beam system which is adequately compensated for the differential scan line bow.

This invention further provides for a multiple-station, single-beam per station system which allows the beams of the different stations to be aligned so that differential bow is essentially eliminated and the scan lines are sagitally aligned.

The invention further provides for a multiple-station, multi-beam per station system which allows the beams of the different stations to be aligned so that differential bow is essentially eliminated and the scan lines are sagittally aligned.

Finally, this invention provides a system which permits the spacing between the beam emitting elements (laser diodes) to be increased, thus easing the design and manufacturing tolerances in the system.

To achieve the above-outlined objectives, this invention provides a generalized solution. In this generalized solution, the goal of eliminating the differential scan line bow is achieved by making the sagital chief ray angles as telecentric as necessary or practically possible. This allows the minimum and maximum bow values for all of the beams to be maintained within a predetermined range. While this range is not necessarily centered on the optical axis, since all of the beams have essentially the same process direction offset and general shapes, no noticeable misregistration is generated. In addition, the optical elements providing bow compensation also correct undesirable scan line wobble generated by pyramidal polygon angular errors.

BRIEF DESCRIPTION OF THE DRAWINGS

The preferred embodiments of this invention will be described in detail with respect to the following drawings, which like reference numerals indicate like elements, and wherein.

Tables 2A–2D list the details of a design based on the criteria specified in Table 1.

Table 3 is a summary of the spot sizes generated by the design shown in Tables 2A–2D; and Table 4 shows the total amount of differential bow and scan line shift generated by the design shown in Tables 2A–2D.

DETAILED DESCRIPTION OF THE PREFERRED EMBODIMENTS

Figure 1:
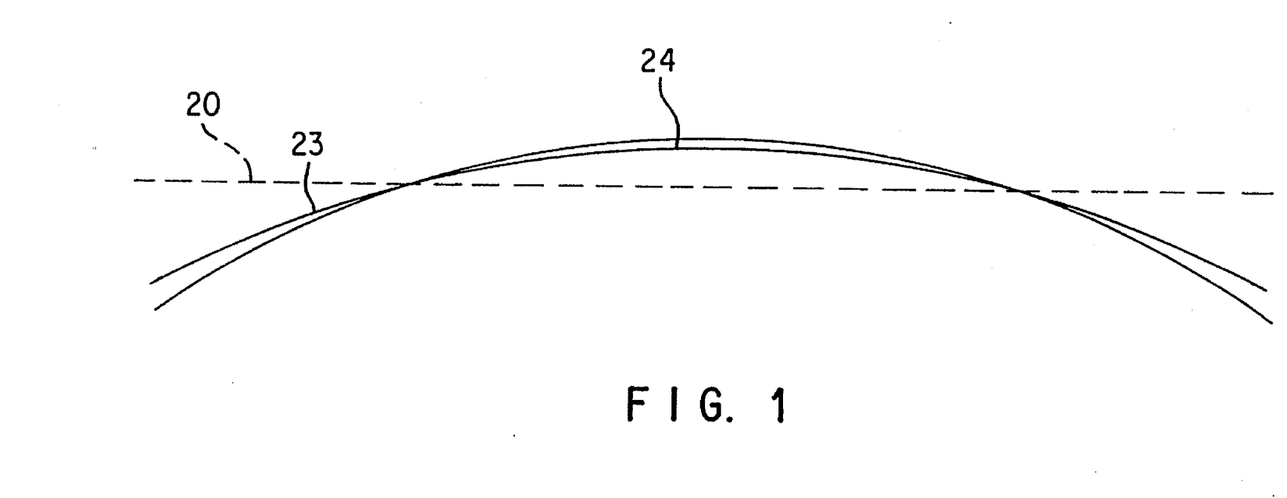
FIG. 1 shows a pair of bowed scan lines having the center of curvatures on the same side of the optical axis but with different radii of curvatures.

FIGS. 1–4 show the various types of errors which can be introduced by differential scan line bow. In FIG. 1, the ideal scan line 20 is shown as a dashed lines. The first bowed scan line 23 has a first radius of curvature which is different from the radius of curvature of the second bowed scan line 24.

Figure 2:
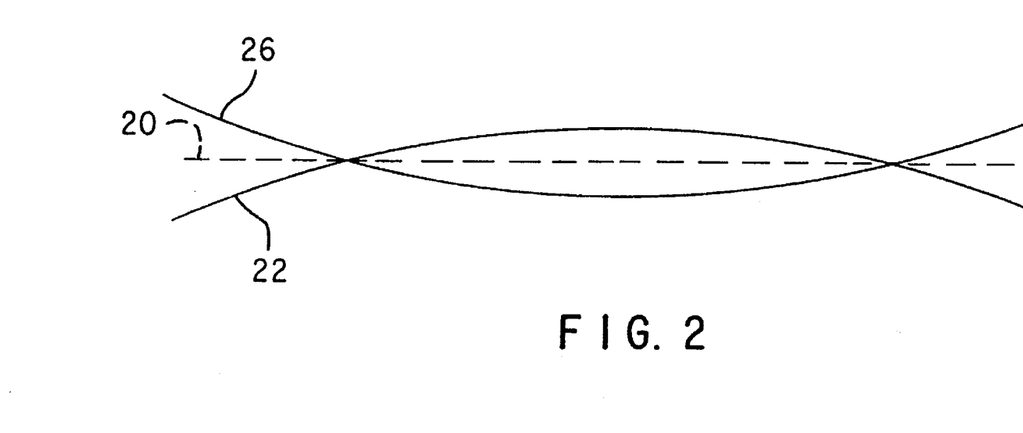
FIG. 2 shows a pair of bowed scan lines having centers of curvature on opposite sides with same or different radii.

In FIG. 2, a third bowed scan line 26 is superimposed over the first bowed scan line 22. As shown in FIG. 2, the third bowed scan line 26 has a center of curvature which is on the opposite side of the ideal scan line 20 from the center of curvature of the first bowed scan line 22.

Figure 3:
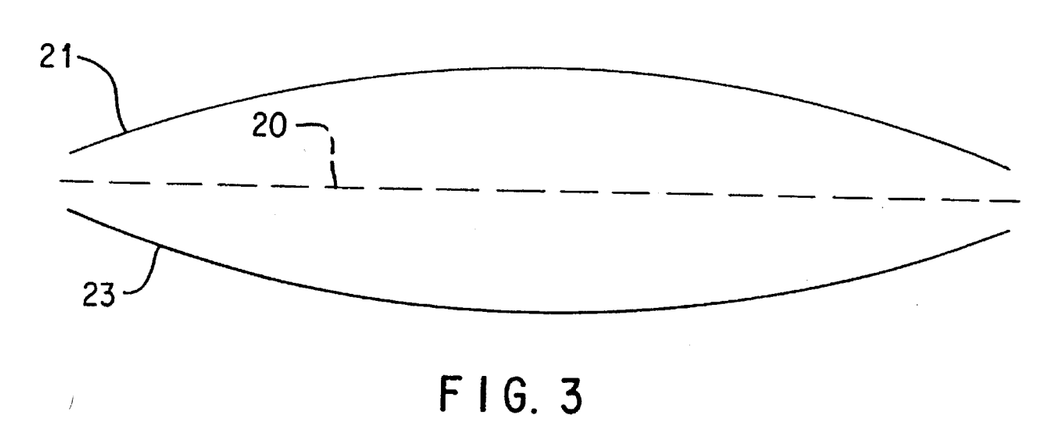
FIG. 3 shows a barrel distortion between a pair of bowed scan lines having centers of curvature on opposite sides with same or different radii.

FIG. 3, the center of curvatures of bowed scan lines 21 and 23 are located on the opposite side of ideal scan line 20 in such a fashion that the bowed scan lines create a pin-cushion distortion. This occurs whether the bowed scan lines 21 and 23 have the same or different radius of curvature.

Figure 4:
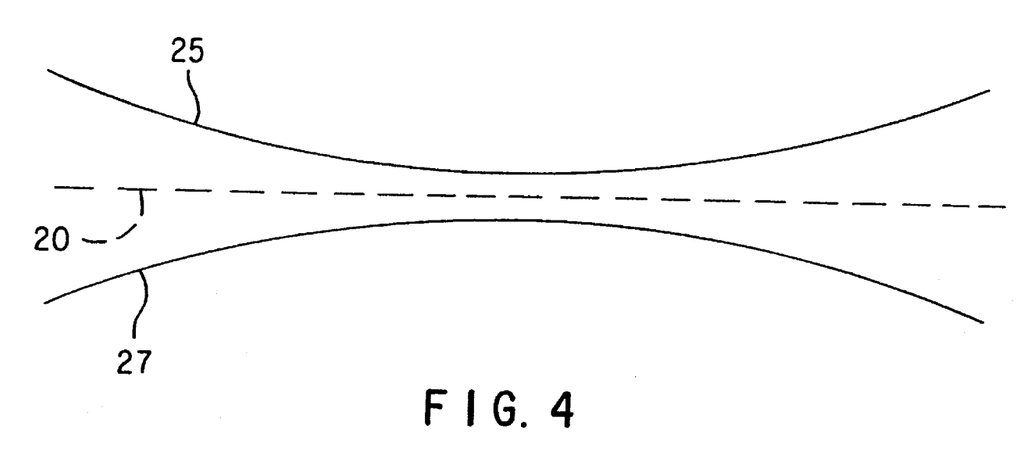
FIG. 4 shows a pin-cushion distortion between a pair of bowed scan lines having centers of curvature on opposite sides with same or different radii.

In FIG. 4, the center of curvatures of bowed scan lines 25 and 27 are also on the opposite side of ideal scan line 20 (with same or different radii) but their arrangement with relation to each other is such that they form a pincushion distortion. Again, this occurs whether the bowed scan lines 25 and 27 have the same or different radii of curvature.

In general, in the first order, all of these distortions in the prior art systems are generated by the considerable angular deviation between the output chief rays and the system axis, as shown in FIG. 5. In contrast to FIGS. 1–4, FIG. 9 shows bow free scan lines 28 and 29 generated by the telecentric nature of the present invention.

Figure 6:
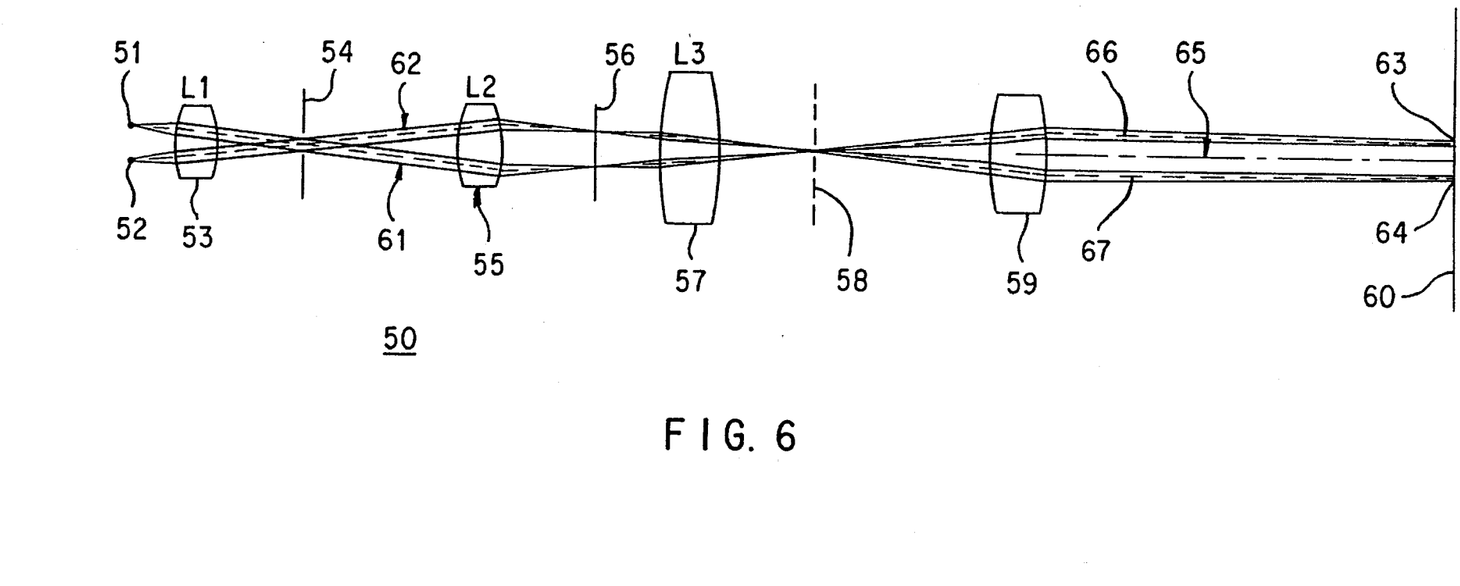
FIG. 6 shows the unfolded sagital block diagram of the optical system of the present invention.

The first preferred embodiment of the present invention, as shown in FIG. 6, provides a general solution for the previously described performance shortcomings. The focal length and position of the collimator lens L1 is chosen such that the aperture plane (where the chief rays cross each other) is imaged in the back focal plane of the MCO. Because of this condition, the MCO will refract the chief rays parallel with the system axis that is common to all of the optical elements. Thus, a telecentric system is created. It should be noted that in the present invention, the combined power of the Fθ lens 37 (lens L3) and the MCO continues to refocus the spots of the laser beams on the PR from the polygon plane into the PR plane. At the same time, the MCO alone looks at the image of the sagital aperture stop that is located in its back focal plane as an object. Because of this, the MCO refracts the chief rays parallel along the system axis. The MCO thus creates the favorable conditions required for scan lines free of differential bow, large depth of focus, and low scan line motion due to polygon error tilt. In general, the chief exit ray of each light beam of the system should be parallel to the system axis within 0.1 degree. However, the chief exit ray of a light beam can be within 1 degree of parallel and still be considered telecentric.

As shown in FIG. 5, which shows the sagital unfolded block diagram of the prior art apparatus 30, a pair of laser diodes 31 and 32 emit a pair of light beams 41 and 42. The light beams 41 and 42 pass through a collimator 33 (lens L1) and cross at a sagital aperture stop 34. The light beams 41 and 42 then continue through an input cylindrical lens which focuses them onto the polygon facet surface 36. After being reflected and scanned by the polygon facet surface 36, the light beams 41 and 42 pass through the Fθ 37 (lens L3). After the Fθ lens, the light beams 41 and 42 pass through an anamorphic motion compensating optic (MCO) 39. The anamorphic motion compensating optic 39 is a cylindrical lens or mirror. After passing through the MCO 39, the light beams 41 and 42 are focused onto the photoreceptor plane 40 forming scanner spots 43 and 44, respectively. The scanner spots 43 and 44 form a scan line of at least 12 inches (i.e., at least a page width) when they are scanned across the photoreceptor.

It should be appreciated that in FIG. 5, the chief exit rays from the MCO are not telecentric. That is, the chief exit rays are not parallel with the system axis 38. It is also important to note that the image of the sagital aperture stop is, in most cases, located in the region 45 located behind the MCO 39.

In contrast, FIG. 6 shows a sagital unfolded block diagram of the first preferred embodiment of this invention. As shown in FIG. 6, the optical system 50 comprises a pair of laser diodes 51 and 52, which emit a pair of laser beams 61 and 62, respectively. It should be noted that the optical system 50 is equally applicable to systems having three or more laser diodes and laser beams. It should be noted that in case of odd number of lasers, the center laser is located on the sagital optical axis.

It should further be appreciated that each laser diode 51 and 52 can each emit its light beam at a wavelength different from the wavelength of the light beam emitted by the other laser diode. Finally, the system is not limited to laser diodes. Any known light emitting device, such as any solid state laser, gas laser, liquid laser or semiconductor laser can be used. Further, a light emitting diode or the like can be used, so long as the emitted light beam can be modulated (either as it is output, or by a micromodulator-type scanner). Thus, a flash lamp or the like could also be used as the light source.

The laser beams 61 and 62 first pass through the collimator 53 (lens L1) and cross at the sagital aperture stop 54. The laser beams 61 and 62 then pass through the input cylindrical lens 55 (lens L2) and are focused onto the polygon facet surface 56. As in FIG. 5, the rotation of the polygon facet surface causes the laser beams 61 and 62 to be scanned across the photoreceptor plane 60 9 in and out of paper). After being reflected by the polygon facet surface 56, the laser beams 61 and 62 pass through the Fθ scan lens 57 (lens L3) and again cross at the image of the sagital aperture stop 58. This is also the back focal plane of the anamorphic motion compensating optic (MCO) 59. It should be noted that in this case, the image of the sagital aperture stop is not only in front of the photoreceptor plane 60, but is also in front of the MCO 59. The MCO 59 comprises a cylindrical lens or cylindrical mirror.

After passing through (or reflected by) the MCO 59, the laser beams 61 and 62 are focused onto the photoreceptor plane 60 to form the scanning spots 63 and 64. Most importantly the chief exit rays 66 and 67, respectively, of the laser beams 61 and 62 are parallel to the system axis 65. That is, the chief exit rays 66 and 67 are telecentric. It should be appreciated that either element of the output optics can have a toroidal surface. In addition, the toroidal surface can have a uniform or non-uniform radius, in either the sagital or tangential direction.

Figure 7:
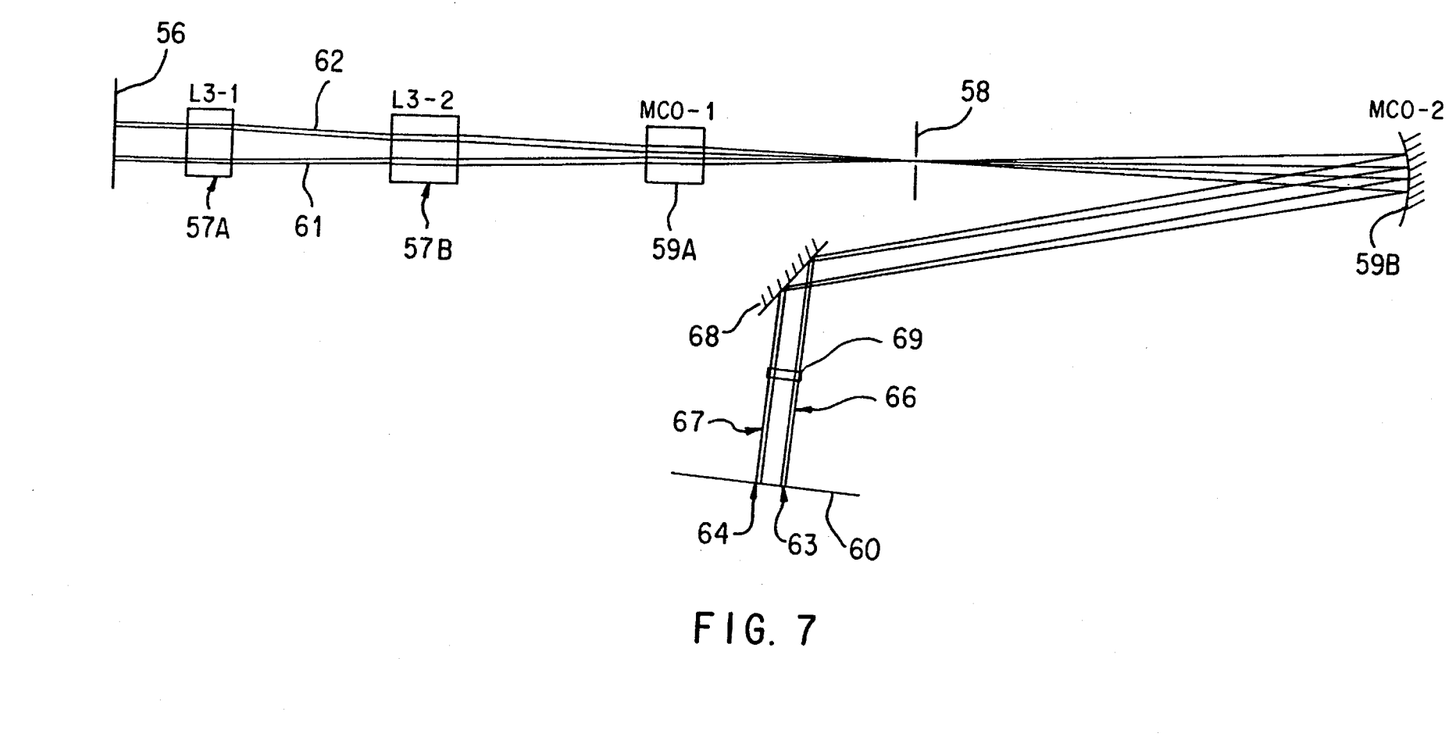
FIG. 7 shows a sagital view of a sagittally telecentric optical system design.

FIG. 7 shows a second preferred embodiment of the present invention. In FIG. 7, only a partial sagital view of a telecentric optical system is shown. In FIG. 7, the portion of the optical system to the left of the polygon facet surface 56 is omitted. In addition, the sagital beam separation is exaggerated in FIG. 7 for clarity.

In FIG. 7, after the laser beams 61 and 62 are reflected by the polygon facet surface 56, they pass through the Fθ lens 57a and 57b. That is, in this embodiment, the Fθ lens 57 is broken up into two portions 57a and 57b. These lenses, lenses L3-1 and L3-2, combine to provide the Fθ compensation. After passing through the second Fθ lens 57b, the laser beams 61 and 62 pass through the first anamorphic motion compensating optic (MCO-1) 59a. The first MCO, MCO-1, comprises a cylindrical lens. Then, after passing through the first MCO 59a, the laser beams 61 and 62 again cross at the image of a sagital aperture stop. It should be noted that, in this case, while the image of the sagital aperture stop remains in front of the photoreceptor plane 60, it is now behind the first MCO 59a. However, after passing through the image of the sagital aperture stop 58, the laser beams 61 and 62 are reflected off of a second anamorphic motion compensator optic (MCO-2) 59b. The second MCO 59b comprises a negative cylindrical mirror. It should again be noted that while the image of the sagital aperture stop 58 is behind the first MCO 59a, it remains before the second MCO 59b.

After being reflected off of the second MCO 59b, the laser beams 61 and 62 are reflected off of a folding mirror 68 and through a window 69 before striking the photoreceptor plane 60. Thus, the laser beams 61 and 62 again form the scanning spots 63 and 64 on the photoreceptor plane 60. Further, the chief rays 66 and 67 are again telecentric. Finally, because the optical system shown in FIG. 7 is able to obtain telecentric chief exit rays by prescribing only the optics from the polygon facet surface 56 to the photoreceptor plane 60, the system 50 requires only that the collimated beam(s) to be input to the polygon facet surface 56. Thus, any pre-polygon optics can be used to obtain the properly collimated beams on the polygon facet surface 56.

Figure 8:
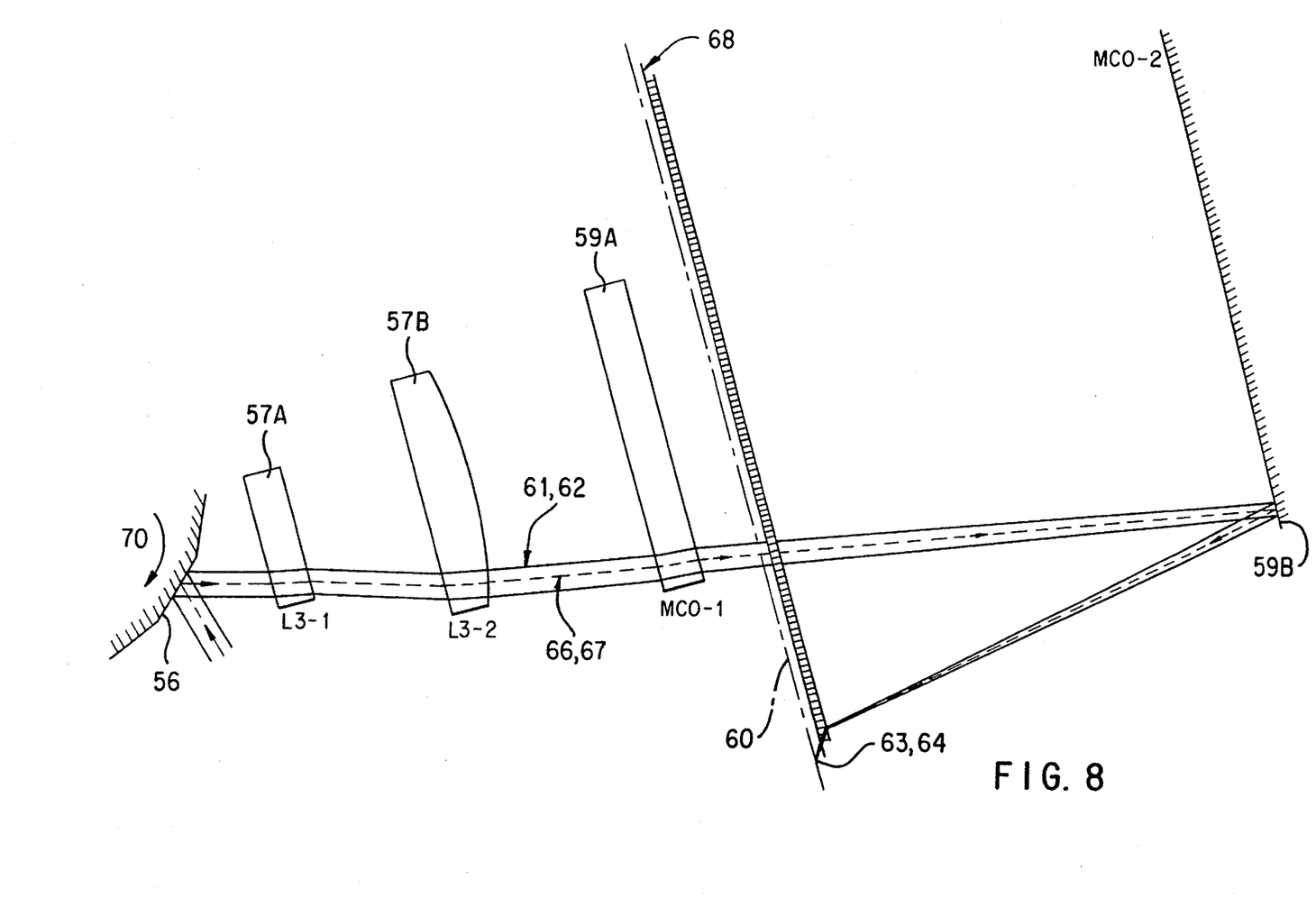
FIG. 8 shows the tangential view of the optical system shown in FIG. 7.

FIG. 8 shows a tangential plot of the partial optical system shown in FIG. 7. As shown in FIG. 8, the laser beams 61 and 62, which lie aligned in the plane of the paper, strike the rotating polygon 7 at the polygon facet surface 56 and are reflected to the Fθ lens 57a and 57b. After passing through the two portions 57a and 57b of the Fθ lens, the laser beams 61 and 62 pass through the first anamorphic motion compensating optic (MCO-1) 59a. After passing through the first MCO 59a, the laser beams 61 and 62 are reflected off of the second MCO 59b and are reflected onto the folding mirror 68. After being reflected from the folding mirror 68, the laser beams 61 and 62 are focused onto the photoreceptor plane 60 at the scanning spot 63 and 64. Again, the chief exit rays 66 and 67 become telecentric in the sagittal plane after being reflected from the second MCO 59b.

It should be appreciated that the scanning device does not need to be a rotating polygon. The scanning device can also be a micromodulator, of any type, as is well-known in the art. In addition, the rotating polygon can have any number of facets, from three to as many as desired to obtain the desired system characteristics. Further, the scanning device, whether a rotating polygon, a micromodulator, or any other known type of scanner, can be underfilled by the light beams, or overfilled by the light beams, or critically filled.

Table 1 below outlines the general specifications for the telecentric ROS optical system shown in FIGS. 6–8.

TABLE 1

GENERAL SPECIFICATIONS FOR THE SAMPLE
TELECENTRIC ROS OPTICAL SYSTEM DESIGNED
BASED ON THE PRESENT INVENTION

| | |
|---|---|
| RESOLUTION: | 600 SPOTS PER INCH |
| SCAN LENGTH: | 11.9 INCH (302.8 MM) |
| WAVELENGTH: | 670 nM |
| NUMBER OF LASERS: | 2 |
| LASER ORIENTATION: | SAGITTALLY OFFSET |
| LASER SEPARATION: | 25 microns |
| INTERLACE FACTOR: | 3 |
| SCAN LINE SEPARATION: | (3 × 1/600 INCH) |

As shown in Table 1, the design specifications for the optical system shown in FIGS. 6–8 requires a resolution of 600 pixels per inch, over a scan line of 11.9 inches. The nominal wavelength for the laser beams is 670 nm and two laser diodes are employed. The laser diodes are vertically aligned into a column, and sagittally (vertically) offset by 25 microns. In addition, the laser beams emitted by the laser diodes are used to form an interlaced image having an interlace factor of 3. Finally, the ultimate scan line separation between adjacent scan lines is 1/200 inch. Alternately, the scan lines can form consecutive, or in-pitch, scan lines, thus forming a block of text during each scan.

Figure 9:
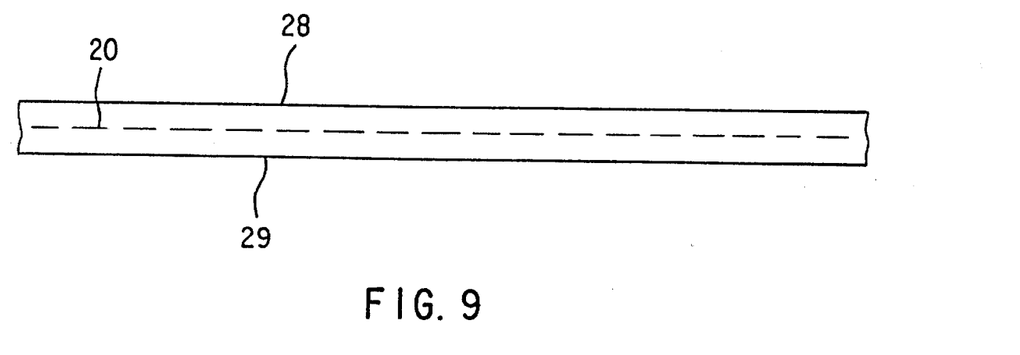
FIG. 9 shows a pair of essentially no-bow scan lines resulting from the optical system shown in FIG. 7.

Tables 2A–2D, which follow FIG. 9, set forth the overall design of the partial optical system shown in FIGS. 6–8.

Table 3 shows the spot size data of a range of focus from +2 mm off the best plane of focus to −2 mm off the plane of best focus. In the leftmost column, the measurement positions extending from the start of scan (SOS) position 1 through the center of scan (COS) position 4 to the end of scan (EOS) position 7 are shown. In the second column, showing the spot size data when the plane of focus is offset by +2 mm from the plane of best focus. As shown in the second column, the sagital or x-direction spot size varies from 40.3 mm to 43.8 mm. At the same time, tangential or y-direction spot size varies from 36.1 mm to 36.7 mm. Thus, the overall variance in the spot size at +2 mm defocus is 3.5 microns in the sagital direction versus 0.6 microns in the tangential direction.

In the third column, which shows the spot size data for the plane of best focus, the sagital variance in the spot size ranges from 40.2 to 43.6 microns. Simultaneously, the tangential variance in the spot size ranges from 35.3 to 36.9 microns. Thus, the overall spot size variance at the plane of best focus has a range of 3.4 in the sagital direction versus 1.6 in the tangential direction. In the rightmost column, which shows the spot size data for the −2 mm defocus plane, the spot size in the sagital direction ranges from 40.4 microns to 43.9 microns. Simultaneously, the spot size varies in the tangential direction from the 35.2 microns to 38.0 microns. Thus, the sagital spot size range is 3.5 microns while the tangential spot size range is 2.8 microns.

Both the sagital and tangential spot sizes over a range of ±2 mm of defocus are well within an acceptable range of variance. The range of variance in the optical system shown in FIGS. 7 and 8 causes no gross or noticeable misregistration or visual effects.

Finally, Table 4 shows the differential bow and scan line shift as a function of the focus position and the polygon facet tilt angle. In column 1, the focus position ranges from the plane of best focus, to +2 mm of defocus, and to −2 mm of defocus. In column 2, the polygon facet tilt is either 0 or ±1 minute of arc.

In column 3, the total differential bow in microns is shown for the various combinations of focus and polygon facet tilt. Finally, in the fourth column, the scan line position shift due only to the polygon facet tilt, in microns, is shown. It should be noted that the scan line position shift equally effects all of the scan lines simultaneously. In the first row, the beams focused on the plane of best focus and no polygon facet tilt, a total differential bow is 3 microns and the scan line position shift is 0. In the following five rows showing different conditions of defocus and polygon facet tilt, the total differential bow varies between 4.4 microns and 4.9 microns, for a total range of 1.9 microns from the focused, no-tilt state. Likewise, the scan line position shift varies from 0.05 microns to 3.1 microns, so that the total line position shift range is 3.1 microns.

It should be noted that the above total differential bow values over the shown range of defocus in polygon tilt values represent only 3.8% of the scan line separation of 127 microns. The 127 micron scan line separation is determined by the specification of 600 spots per inch and an interlace factor of 3. In addition, the maximum scan line shift represents only 2.4% of the 127 micron scan line separation.

In general, the scan line shift compensation can be considered excellent when the shift is under 4 to 5 microns total, or under 3% of the scan line separation. Likewise, the differential bow compensation can be considered excellent when it is under 4 to 5 microns total, or under 4% of the scan line separation. In addition, the scan line position shift can be considered acceptable when it is under 10 microns total, or under 6% of the scan line separation, while the difference of bow compensation is acceptable when it is under 10 microns total or under 8% of the scan line separation.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention.

TABLE 2A res
  File PAT2.LEN(5) has been restored
  Lens title: "No Bow Pyr Comp Dual Telecentric system"
  Error function: 0.3094725E+02
CODE V>lis
  No Bow Pyr Comp Dual Telecentric system

|  |  | RDY |  | THI | RMD |  | GLA | CCY | THC | GLC |
|---|---|---|---|---|---|---|---|---|---|---|
| >OBJ: |  | INFINITY |  | INFINITY |  |  |  | 100 | 100 |  |
| STD: |  | INFINITY |  | 185.000000 |  |  |  | 100 | 0 |  |
| 2: |  | INFINITY |  | 5.000000 |  |  | BK7_SCHOTT | 100 | 100 |  |
|  | CYL: |  |  |  |  |  |  |  |  |  |
|  | RDX: | 53.13117 | CCX | 0 |  |  |  |  |  |  |
| 3: |  | INFINITY |  | 23.595324 |  |  |  | 100 | 0 |  |
| 4: |  | INFINITY |  | 1.479432 |  |  |  | 100 | 100 |  |
| 5: |  | INFINITY |  | 0.000000 | REFL |  |  | 100 | 100 |  |
|  | XDE: | 0.000000 | YDE: | 0.000000 |  | ZDE: | 0.000000 |  |  |  |
|  | XDC: | 100 | YDC: | 100 |  | ZDC: | 100 |  |  |  |
|  | ADE: | 15.000000 | BDE: | 0.000000 |  | CDE: | 0.000000 |  |  |  |
|  | ADC: | 100 | BDC: | 100 |  | CDC: | 100 |  |  |  |
| 6: |  | INFINITY |  | −42.670000 |  |  |  | 100 | 100 |  |

TABLE 2A-continued res
  File PAT2.LEN(5) has been restored
  Lens title: "No Bow Pyr Comp Dual Telecentric system"
  Error function: 0.3094725E+02
CODE V>lis
  No Bow Pyr Comp Dual Telecentric system

|   |      | RDY       |      | THI        | RMD |      | GLA       | CCY | THC | GLC |
|---|------|-----------|------|------------|-----|------|-----------|-----|-----|-----|
|   | XDE: | 0.000000  | YDE: | 0.000000   |     | ZDE: | 0.000000  |     |     |     |
|   | XDC: | 100       | YDC: | 100        |     | ZDC: | 100       |     |     |     |
|   | ADE: | 15.000000 | BDE: | 0.000000   |     | CDE: | 0.000000  |     |     |     |
|   | ADC: | 100       | BDC: | 100        |     | CDC: | 100       |     |     |     |
| 7: |    | INFINITY  |      | −1.350000  |     |      | BK7_SCHOTT | 100 | 100 |     |
| 8: |    | INFINITY  |      | −31.550000 |     |      |           | 100 | 100 |     |
| 9: |    | INFINITY  |      | −27.500000 |     |      |           | 100 | 100 |     |
|   | XDE: | 0.000000  | YDE: | 0.000000   |     | ZDE: | 0.000000  |     |     |     |
|   | XDC: | 100       | YDC: | 100        |     | ZDC: | 100       |     |     |     |
|   | ADE: | 30.000000 | BDE: | 0.000000   |     | CDE: | 0.000000  |     |     |     |
|   | ADC: | 100       | BDC: | 100        |     | CDC: | 100       |     |     |     |
| 10: |   | INFINITY  |      | 27.500000  |     |      |           |     |     |     |
|   | XDE: | 0.000000  | YDE: | −0.800000  |     | ZDE: | 0.000000  |     |     |     |
|   | XDC: | 100       | YDC: | 100        |     | ZDC: | 100       |     |     |     |
|   | ADE: | −15.000000| BDE: | 0.000000   |     | CDE: | 0.000000  |     |     |     |
|   | ADC: | 100       | BDC: | 100        |     | CDC: | 100       |     |     |     |
| 11: |   | INFINITY  |      | 0.000000   |     |      |           | 100 | 100 |     |
|   | XDE: | 0.000000  | YDE: | 0.000000   |     | ZDE: | 0.000000  |     |     |     |
|   | XDC: | 100       | YDC: | 100        |     | ZDC: | 100       |     |     |     |
|   | ADE: | 0.000000  | BDE: | 0.000000   |     | CDE: | 0.000000  |     |     |     |
|   | ADC: | 100       | BDC: | 100        |     | CDC: | 100       |     |     |     |

TABLE 2B

|   |      | RDY         |      | THI         |     |      | GLA       | CCY | THC | GLC |
|---|------|-------------|------|-------------|-----|------|-----------|-----|-----|-----|
| 12: |   | INFINITY    |      | 0.000000    |     |      |           | 100 | 100 |     |
| 13: |   | INFINITY    |      | 0.000000    |     |      |           | 100 | 100 |     |
|   | XDE: | 0.000000    | YDE: | 0.000000    |     | ZDE: | 0.000000  |     |     |     |
|   | XDC: | 100         | YDC: | 100         |     | ZDC: | 100       |     |     |     |
|   | ADE: | 0.000000    | BDE: | 0.000000    |     | CDE: | 0.000000  |     |     |     |
|   | ADC: | 100         | BDC: | 100         |     | CDC: | 100       |     |     |     |
| 14: |   | INFINITY    |      | −27.500000  |     |      |           | 100 | 100 |     |
|   | XDE: | 0.000000    | YDE: | 0.000000    |     | ZDE: | 0.000000  |     |     |     |
|   | XDC: | 100         | YDC: | 100         |     | ZDC: | 100       |     |     |     |
|   | ADE: | 0.000000    | BDE: | 0.000000    |     | CDE: | 0.000000  |     |     |     |
|   | ADC: | 100         | BDC: | 100         |     | CDC: | 100       |     |     |     |
| 15: |   | INFINITY    |      | 0.000000    |     |      |           | 100 | 100 |     |
|   | XDE: | 0.000000    | YDE: | 0.000000    |     | ZDE: | 0.000000  |     |     |     |
|   | XDC: | 100         | YDC: | 100         |     | ZDC: | 100       |     |     |     |
|   | ADE: | 15.000000   | BDE: | 0.000000    |     | CDE: | 0.000000  |     |     |     |
|   | ADC: | 100         | BDC: | 100         |     | CDC: | 100       |     |     |     |
| 16: |   | INFINITY    |      | 27.500000   |     |      |           | 100 | 100 |     |
|   | XDE: | 0.000000    | YDE: | 0.800000    |     | ZDE: | 0.000000  |     |     |     |
|   | XDC: | 100         | YDC: | 100         |     | ZDC: | 100       |     |     |     |
|   | ADE: | 0.000000    | BDE: | 0.000000    |     | CDE: | 0.000000  |     |     |     |
|   | ADC: | 100         | BDC: | 100         |     | CDC: | 100       |     |     |     |
| 17: |   | INFINITY    |      | 0.000000    |     |      |           | 100 | 100 |     |
|   | XDE: | 0.000000    | YDE: | 0.000000    |     | ZDE: | 0.000000  |     |     |     |
|   | XDC: | 100         | YDC: | 100         |     | ZDC: | 100       |     |     |     |
|   | ADE: | 30.000000   | BDE: | 0.000000    |     | CDE: | 0.000000  |     |     |     |
|   | ADC: | 100         | BDC: | 100         |     | CDC: | 100       |     |     |     |
| 18: |   | INFINITY    |      | 16.330176   |     |      |           | 100 | 0   |     |
|   | XDE: | 0.000000    | YDE: | −1.700000   |     | ZDE: | 0.000000  |     |     |     |
|   | XDC: | 100         | YDC: | 100         |     | ZDC: | 100       |     |     |     |
|   | ADE: | 0.000000    | BDE: | 0.000000    |     | CDE: | 0.000000  |     |     |     |
|   | ADC: | 100         | BDC: | 100         |     | CDC: | 100       |     |     |     |
| 19: |   | −185.94901  |      | 8.000000    |     |      | SF10_SCHOTT |  0  | 100 |     |
| 20: |   | −573.98236  |      | 30.000000   |     |      |           | 0   | 100 |     |
| 21: |   | −1632.15436 |      | 12.000000   |     |      | SF10_SCHOTT | 0   | 100 |     |
| 22: |   | −122.45377  |      | 35.351581   |     |      |           | 0   | 0   |     |
| 23: |   | INFINITY    |      | 10.000000   |     |      | SF10_SCHOTT | 100 | 100 |     |
|   | CYL: |           |      |             |     |      |           |     |     |     |
|   | RDX: | −49.77269   | CCX: | 0           |     |      |           |     |     |     |
| 24: |   | INFINITY    |      | 129.299274  |     |      |           | 100 | 0   |     |

TABLE 2C

|     |      |           |      |             |      |            |          |     |     |
|-----|------|-----------|------|-------------|------|------------|----------|-----|-----|
|     | CYL: |           |      |             |      |            |          |     |     |
|     | RDX: | −85.49645 | CCX: | 0           |      |            |          |     |     |
| 25: |      | INFINITY  |      | 0.000000    | REFL |            |          | 100 | 100 |
|     | CYL: |           |      |             |      |            |          |     |     |
|     | RDX: | −177.10351 | CCX | 0           |      |            |          |     |     |
|     | XDE: | 0.000000  | YDE: | 0.000000    |      | ZDE:       | 0.000000 |     |     |
|     | XDC: | 100       | YDC: | 100         |      | ZDC:       | 100      |     |     |
|     | ADE: | 0.000000  | BDE: | 5.384800    |      | CDE:       | 0.000000 |     |     |
|     | ADC: | 100       | BDC: | 100         |      | CDC:       | 100      |     |     |
| 26: |      | INFINITY  |      | −113.303233 |      |            |          | 100 | 0   |
|     | XDE: | 0.000000  | YDE: | 0.000000    |      | ZDE:       | 0.000000 |     |     |
|     | XDC: | 100       | YDC: | 100         |      | ZDC:       | 100      |     |     |
|     | ADE: | 0.000000  | BDE: | 5.384800    |      | CDE:       | 0.000000 |     |     |
|     | ADC: | 100       | BDC: | 100         |      | CDC:       | 100      |     |     |
| 27: |      | INFINITY  |      | 0.000000    |      |            |          | 100 | 100 |
|     | XDE: | 0.000000  | YDE: | 0.000000    |      | ZDE:       | 0.000000 |     |     |
|     | XDC: | 100       | YDC: | 100         |      | ZDC:       | 100      |     |     |
|     | ADE: | 0.000000  | BDE: | −53.701400  |      | CDE:       | 0.000000 |     |     |
|     | ADC: | 100       | BDC: | 100         |      | CDC:       | 100      |     |     |
| 28: |      | INFINITY  |      | 17.000000   | REFL |            |          | 100 | 100 |
|     | XDE: | 0.000000  | YDE: | 0.000000    |      | ZDE:       | 0.000000 |     |     |
|     | XDC: | 100       | YDC: | 100         |      | ZDC:       | 100      |     |     |
|     | ADE: | 0.000000  | BDE: | −53.701400  |      | CDE:       | 0.000000 |     |     |
|     | ADC: | 100       | BDC: | 100         |      | CDC:       | 100      |     |     |
| 29: |      | INFINITY  |      | 1.350000    |      | BK7_SCHOTT |          | 100 | 100 |
| 30: |      | INFINITY  |      | 18.410103   |      |            |          | 100 | 0   |
| 31: |      | INFINITY  |      | 0.000000    |      |            |          | 100 | 100 |
| IMG:|      | INFINITY  |      | 0.000000    |      |            |          | 100 | 100 |

SPECIFICATION DATA

| | |
|---|---|
| EPD | 5.40000 |
| PUX | 0.41300 |
| PUY | 1.09000 |
| PUI | 0.50000 |
| DIM | MM |
| WL  | 670.00 |
| REF | 1 |
| WTW | 1 |
| XAN | 0.05730 |
| YAN | 0.00000 |
| VUX | 0.83000 |
| VLX | 0.83000 |
| VUY | 0.00000 |
| VLY | 0.00000 |

APERTURE DATA/EDGE DEFINITIONS

TABLE 2D

CA
  APERTURE data not specified for surface Obj thru 32

REFRACTIVE INDICES

| GLASS CODE | 670.00 |
|---|---|
| BK7_SCHOTT | 1.513906 |
| SF16_SCHOTT | 1.719653 |

No solves defined in system

|          | POS 1 | POS 2 | POS 3 | POS 4 | POS 5 | POS 6 | POS 7 |
|----------|-------|-------|-------|-------|-------|-------|-------|
| Zoom DATA |      |       |       |       |       |       |       |
| RSL      | DEF   | DEF   | DEF   | DEF   | DEF   | DEF   | DEF   |
| ADE S10  | −15.00000 | −10.00000 | −7.50000 | 0.00000 | 7.50000 | 10.00000 | 15.00000 |
| ADC S10  | 100   | 100   | 100   | 100   | 100   | 100   | 10D   |
| ADE S15  | 15.00000 | 10.00000 | 7.50000 | 0.00000 | −7.50000 | −10.00000 | −15.00000 |
| ADC S15  | 100   | 100   | 100   | 100   | 100   | 100   | 100   |

This is a decentered system, if elements with power are decentered or tilted, the first order properties are probably inadequate in describing the system characteristics.

INFINITE CONJUGATES

| EFL | 286.5928 | 286.5928 | 286.5928 | 286.5928 | 286.5928 | 286.5928 | 286.5928 |
|---|---|---|---|---|---|---|---|

TABLE 2D-continued

CA
APERTURE data not specified for surface Obj thru 32
REFRACTIVE INDICES

| GLASS CODE | |
|---|---|
| BK7_SCHOTT | 670.00 |
| SF16_SCHOTT | 1,513906 |
| | 1,719653 |

No solves defined in system

|  | POS 1 | POS 2 | POS 3 | POS 4 | POS 5 | POS 6 | POS 7 |
|---|---|---|---|---|---|---|---|
| BFL | 0.1362 | 0.1362 | 0.1362 | 0.1362 | 0.1362 | 0.1362 | 0.1362 |
| FFL | 85.4742 | 85.4742 | 85.4742 | 85.4742 | 85.4742 | 85.4742 | 85.4742 |
| FND | 53.0727 | 53.0727 | 53.0727 | 53.0727 | 53.0727 | 53.0727 | 53.0727 |
| ING DIS | 0.0000 | 0.0000 | 0.0000 | 0.0000 | 0.0000 | 0.0000 | 0.0000 |
| OAL | 303.9427 | 303.9427 | 303.9427 | 303.9427 | 303.9427 | 303.9427 | 303.9427 |
| PARAXIAL IMAGE | | | | | | | |
| HT | 0.0000 | 0.0000 | 0.0000 | 0.0000 | 0.0000 | 0.0000 | 0.0000 |
| ANG | 0.0000 | 0.0000 | 0.0000 | 0.0000 | 0.0000 | 0.0000 | 0.0000 |
| ENTRANCE PUPIL | | | | | | | |
| DIA | 5.4000 | 5.4000 | 5.4000 | 5.4000 | 5.4000 | 5.4000 | 5.4000 |
| THI | 0.0000 | 0.0000 | 0.0000 | 0.0000 | 0.0000 | 0.0000 | 0.0000 |
| EXIT PUPIL | | | | | | | |
| DIA | 18.1061 | 18.1061 | 18.1061 | 18.1061 | 18.1061 | 18.1061 | 18.1061 |
| THI | 961.0744 | 961.0744 | 961.0744 | 961.0744 | 961.0744 | 961.0744 | 961.0744 |
| STO DIA | 5.4000 | 5.4000 | 5.4000 | 5.4000 | 5.4000 | 5.4000 | 5.4000 |

TABLE 3

SPOT SIZE DATA

| POS NO | +2 mm Defocus Sag × Tang X × Y Microns | Plane of Best focus Sag × Tang X × Y Microns | −2 mm Defocus Sag × Tang X × Y Microns |
|---|---|---|---|
| SOS 1 | 40.3 × 36.1 | 40.2 × 35.67 | 40.4 × 37.38 |
| 2 | 41.8 × 36.38 | 42.43 × 33.37 | 43.66 × 35.17 |
| 3 | 43.6 × 36.38 | 43.6 × 35.67 | 43.87 × 35.67 |
| COS 4 | 43.8 × 36.74 | 43.6 × 35.5 | 43.87 × 35.67 |
| 5 | 42.74 × 36.1 | 43.04 × 35.32 | 43.66 × 35.8 |
| 6 | 40.59 × 36.73 | 40.59 × 35.67 | 42.03 × 35.67 |
| EOS 7 | 40.34 × 36.73 | 40.2 × 36.9 | 40.36 × 38.0 |

TABLE 4

DIFFERENTIAL BOW AND SCAN LINE SHIFT AS THE FUNCTION OF FOCUS POSITION AND POLYGON FACET TILT.

| | | TOTAL DIFFERENTIAL BOW (MICRONS) | SCAN LINE POSITION SHIFT DUE TO POLYGON FACET TILT (MICRONS) |
|---|---|---|---|
| FOCUSSED | NO POLYGON FACET TILT | 3.0 | NONE |
| +2 mm Defocus | NO POLYGON FACET TILT | 4.6 | 0.1 |
| −2 mm Defocus | NO POLYGON FACET TILT | 4.7 | 0.2 |
| Focussed | +1 MIN OF ARC POLYGON TILT | 4.4 | 0.05 |
| +2 mm Defocus | +1 MIN OF ARC POLYGON TILT | 4.9 | 3.1 |
| −2 mm Defocus | +1 MIN OF ARC POLYGON TILT | 4.6 | 3.1 |

What is claimed is:

1. A raster output scanner optical system for a printing apparatus, the optical system comprising:

at least one light emitting device, each light emitting device emitting at least one light beam;

a photoreceptor;

a scanning device scanning each at least one light beam along the photoreceptor;

an input optical system including an aperture plane, the input optical system collimating the at least one light beam and providing the at least one collimated light beam to the scanning device; and an output optical system comprising,
an Fθ optical element, and
a motion compensation optical element, the output optical system, focusing the at least one light beam onto the photoreceptor, and aligning at least a chief exit ray of each at least one light beam exiting the output optical system with a system axis of the optical system, wherein the input optical system is positioned relative to the motion compensation optical element such that the aperture plane is imaged in a back focal plane of the motion compensation optical element.

2. The raster output scanner of claim 1, wherein at least the chief exit ray of each at least one light beam is aligned to within 0.1 degree of parallel to the system axis.

3. The raster output scanner of claim 1, wherein at least the chief exit ray of each at least one light beam is scanned along a scan line, the scan line being at least 12 inches long.

4. The raster output scanner of claim 1, wherein the scanning device is a micromodulator.

5. The raster output scanner of claim 1, wherein the scanning device is a rotating polygon having a plurality of reflective facets.

6. The optical system of claim 5, wherein the rotating polygon has at least 3 facets.

7. The optical system of claim 1, wherein the at least one light emitting device comprises a plurality of light emitting elements.

8. The optical system of claim 7, wherein the light beams emitted by the plurality of light emitting elements form interlaced scan lines on the photoreceptor.

9. The optical system of claim 7, wherein the light beams emitted by the plurality of light emitting elements form in-pitch scan lines on the photoreceptor.

10. The optical system of claim 7, wherein the plurality of light emitting elements are arranged in a linear array, the linear array extending at an angle to the system axis of the optical system.

11. The optical system of claim 10, wherein the linear array extends in one of a sagittal direction of the optical system, a tangential direction of the optical system, and at an angle relative to the tangential and sagittal directions of the optical system.

12. The optical system of claim 10, wherein the array is perpendicular to the optical axis.

13. The optical system of claim 10, wherein the array extends at an angle along the system axis.

14. The optical system of claim 7, wherein each one of the plurality of light emitting elements emits light at a different wavelength.

15. The raster output scanner of claim 7, wherein each one of the plurality of light emitting elements emits a light beam having a wavelength different from the light beam emitted by any other one of the plurality of light emitting elements.

16. The optical system of claim 1, wherein the at least one light emitting device comprises a light emitting element.

17. The optical system of claim 1, wherein the at least one light emitting device comprises at least one of a solid state laser, a diode laser, a gas laser, a liquid laser, and a semiconductor laser.

18. The raster output scanner of claim 1, wherein at least one optical element of the output optical system has a toroidal surfaces having a uniform radius in a sagittal plane.

19. The raster output scanner of claim 1, wherein at least one optical element of the output optical system has a toroidal surface having a uniform radius in a tangential plane.

20. The raster output scanner of claim 1, wherein at least one optical element of the output optical system has a toroidal surface having a non-uniform radius in a sagittal plane.

21. The raster output scanner of claim 1, wherein at least one optical element of the output optical system has a toroidal surface having a non-uniform radius in a tangential plane.

22. A single-pass, monochrome raster output scanner printer, comprising:

light emitting means for emitting a plurality of light beams;

a photoreceptor;

scanning means for scanning the plurality of light beams across the photoreceptor;

input optic means for collimating and focusing the plurality of beams onto the scanning means, the input optic means comprising an aperture plane; and output optic means for focusing the plurality of light beams onto the photoreceptor and for aligning at least a chief exit ray each one of the plurality of light beams exiting the output optic means with a system axis of the printer, wherein the input optic means is positioned such that the aperture plane is imaged in a back focal plane of an element of said output optic means.

23. A multi-station raster output scanning printer apparatus, comprising:

a plurality of photoreceptor stations, each station including a photoreceptor; and a plurality of raster output scanners, one raster output scanner associated with each one of the plurality of photoreceptor stations, each raster output scanner comprising:

a light emitting device emitting at least one light beam;

an input optical system collimating the at least one beam, the input optical system comprising an aperture plane;

a light scanner scanning the light beam across the corresponding photoreceptor; and an output optical system aligning at least a chief exit ray of the at least one light beam with a system axis and focusing the at least one light beam onto the photoreceptor, wherein the input optical system is positioned such that the aperture plane is imaged in a back focal plane of at least one element of the output optical system.

24. The multi-station raster output scanning printer apparatus of claim 23, wherein the light emitting device of each raster output scanner emits a plurality of light beams.

25. The multi-station raster output scanning printer apparatus of claim 23, wherein each station forms an image using a color different from other ones of the plurality of stations.

26. A multi-station raster output scanning printer apparatus comprising:

a plurality of photoreceptor stations, each station including a photoreceptor; and a raster output scanner comprising:

a light emitting device emitting a plurality of light beams;

an input optical system collimating the plurality of light beams, the input optical system comprising an aperture plane;

a scanner device scanning the light beams; and output optical means for separating and directing one set of the plurality of light beams to each one of the plurality of photoreceptor stations, for aligning the set of light beams with a system axis of the corresponding photoreceptor station, and for focusing the set of light beams on the photoreceptor of the corresponding photoreceptor station, wherein the input optical means is positioned such that the aperture plane is imaged in a back focal plane of at least one element of the output optical means.

27. The multi-station raster output scanning printer apparatus of claim 26, wherein each set of light beams comprises a plurality of light beams.

28. The multi-station raster output scanning printer apparatus of claim 26, wherein each station forms an image using a color from other ones of the plurality of stations.

29. A raster output scanning printer apparatus comprising:
a photoreceptor station, including a photoreceptor;
a light emitting device emitting at least one light beam;
an input optical system including an aperture plane, the input optical system collimating the at least one light beam;
a multi-facet rotating polygon scanner scanning the light beam across the photoreceptor; and
an output optical system comprising:
- a first set of optical elements imaging a facet plane of the scanner onto an image plane of the photoreceptor, and
- a second set of optical elements refracting at least a chief exit ray of each light beam into a substantially parallel relationship with a system axis, wherein the input optical system is positioned such that the aperture plane is imaged in a back focal plane of at least one element of the second set of optical elements.

30. A raster output scanning printer apparatus, comprising:
a photoreceptor station, including a photoreceptor;
a light emitting device emitting at least one light beam;
an input optical system collimating the at least one light beam, including a sagittal aperture stop;
a raster output scanner scanning the light across the photoreceptor;
an output optical system focusing the at least one light beam on the photoreceptor, wherein the sagittal aperture stop is imaged onto a back focal plane of an optical element of the output optical system, such that at least a chief exit ray of each at least one light beam is aligned with a system axis.

* * * * *